United States Patent Office 2,836,227
Patented May 27, 1958

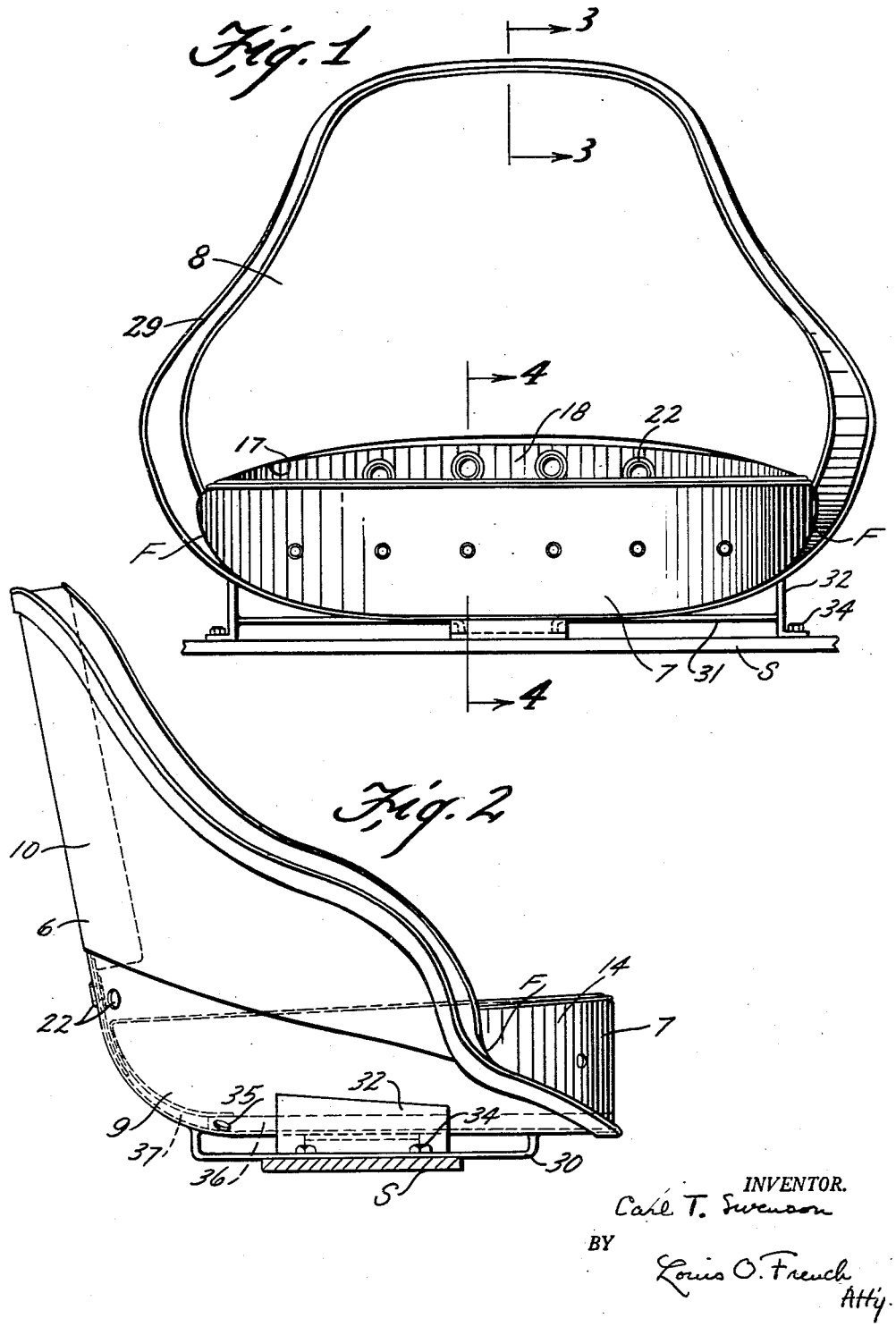

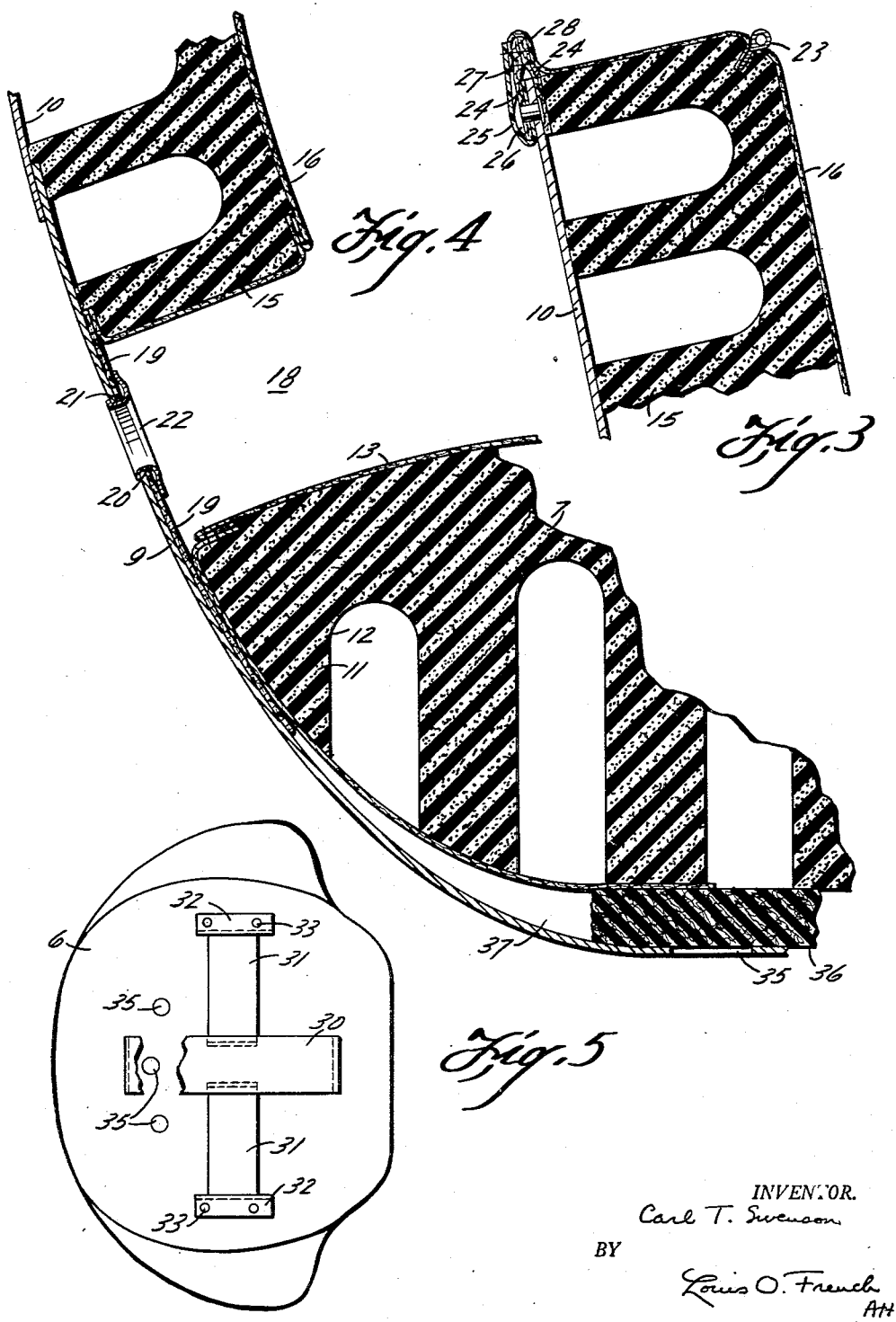

2,836,227
CUSHIONED SEAT

Carl T. Swenson, Milwaukee, Wis., assignor to Milsco Manufacturing Company, Milwaukee, Wis., a corporation of Wisconsin Application April 12, 1956, Serial No. 577,717

4 Claims. (Cl. 155—179)

The invention relates to cushioned seats and more particularly to a seat for heavy industrial mobile equipment such as bulldozers, shovels, scrapers, and the like.

Operators of equipment of the type above described are confined to their seats for several hours at a time and may perspire quite freely. According to the present invention, the seat is constructed to provide a ventilating space between the back and seat cushions to dissipate the body heat of the operator.

A further object of the invention is to provide a new and improved edging construction between the metal frame of the seat and the back and side arm cushion of improved appearance and durability.

A further object of the invention is to provide a seat construction which permits water to drain from the bottom of the seat should it run down behind the cushion.

The invention further consists in the several features hereinafter set forth and more particularly defined by claims at the conclusion hereof.

In the drawings:

Fig. 1 is a front elevation view of a seat embodying the invention;

Fig. 2 is a side elevation view of the seat;

Fig. 3 is a detailed vertical sectional view taken on the line 3—3 of Fig. 1;

Fig. 4 is a detailed vertical sectional view taken on the line 4—4 of Fig. 1;

Fig. 5 is a bottom plan view of the seat, parts being broken away.

Referring to the drawings, the seat comprises a metal seat frame 6, a bottom cushion 7, and a combined back, side, and arm rest cushion 8.

The seat frame 6 is formed of heavy sheet metal and comprises a bottom section 9 of bucket or body contour form and an upper section 10 that is curved at the back and sides and its lower edge spot welded or otherwise suitably secured to the lapped top edge of the bottom section (see Fig. 4).

The bottom cushion 7 is formed of cushioning material 11, such as foam rubber having spaced openings 12 for additional resiliency and provided with a covering 13 of leather or other suitable flexible material. The front portion 14 of this cushion projects outwardly from the side portions of the frame.

The cushion 8, formed of foam rubber 15, similar to that for the cushion 7, is provided with a covering 16 of leather or other suitable flexible material. This cushion is cemented to the upper section 10 of the frame and covers both the sides and back thereof except that its lower edge portion 17 from its point of joinder with the front sides of the cushion 7 is upwardly curved to provide a ventilating space 18 between the cushions 7 and 8 as shown in Figs. 1, 2, and 4. The exposed portion of the frame in this space has its inner side covered by a covering 19 of leather or other suitable flexible material which is cemented to the frame. A series of ventilating openings 20 are provided in that portion of the frame bounded by the space 18. Similar openings 21 are provided in the covering 19, and these openings are given a finished appearance by metal grommets or tubular rivets 22. This space 18 permits some circulation of air about the lower portion of the back of the operator since it permits free up and down movement of the bottom seat by the operator thereon, which in effect produces a pumping action wherein air is sucked into this space as the seat moves down and is expelled from this space as the seat moves up. Thus the space 18 forms in effect a pump clearance space. Due to the terrain in which tractors provided with seats embodying the invention work there is generally a frequent up and down movement of the operator with the bottom portion of the seat.

The edge portion at the front of the cushion 8 has a piping strip 23 mounted over it and stitched to the covering 16 as indicated in Fig. 3. This piping strip is also shown in Figs. 1 and 2 as disposed inwardly of the outer edge of the frame and extending from along the top of the back cushion down along the sides of this cushion to a position below the top of the bottom cushion.

Those portions of the cushion 7 and 8 and their coverings that are disposed adjacent the outer rough edge of the sections of the metal frame are protected by an edge binding construction shown in detail in Fig. 3. This binding comprises a pair of relatively thick strips 24 of leather disposed on opposite sides of the frame and projecting beyond the edge thereof. The outer of the strips 24 together with a leather or lighter flexible material covering strip 25 is anchored to the frame at spaced intervals by securing these two piles of material thereto by rivets 26. The inner of the strips 24 covers the inner side of the metal frame and the rivet shanks and extends outwardly beyond the edge of the frame and at this extended portion is secured to the strip 24 by a line of stitching 27. The strip 25 is bent around the lower edge of the said outer strip 24 and then extended upwardly outside of the same, and its top edge is secured to the covering 16 and both of the outer edge portions of the strips 24 by stitching 28. It will be noted from Fig. 1 that this protected edge 29 is continuous and is associated with the covering 11 of the bottom cushion 7 in the same way as above described in connection with the covering 16.

The seat above described may be attached to the vehicle on which it is used in various ways. In Figs. 2 and 5 I have indicated a lengthwise extending centrally disposed metal channel member 30 whose legs are welded to the bottom of the seat frame and the central portion of whose web has portions of metal side brackets 31 welded thereto. These portions at their outer ends are welded to angled members 32 that have spaced openings 33 to receive bolts or screws 34 for clamping the seat to a support S as indicated in Figs. 1 and 2.

It is to be noted that the covering 19 meets the covering 16 in a folded over edge indicated at F so as to form in effect a continuous connection of these coverings where they are attached to the protective strips 24.

Referring to Fig. 4, the covering 19 is secured on one side by adhesive to the bottom frame 9 and extends down below the top of the cushion 7, and where it contacts the side covering of this cushion, is secured thereto by adhesive to provide a water-tight connection. Should, however, water find its way down between the bottom cushion and said covering 19, means are provided for effectively draining such leakage from the bottom of the seat. For this purpose a layer of yieldable material 36 is interposed between the bottom part of the bottom frame 9 and the main bottom portion of the cushion 7. The covering 13 extends down from the top of the cushion 7 so as to overlap the back edge of the yieldable material 36 to which it is secured by adhesive. The yieldable material may be suitable animal hair that has been treated with a suitable rubber composition to form what is called a rubberized hair. This material itself is impervious to water, but since the hairs are loosely felted together, it will allow water to pass through it so that any water that might drain down from the top of the cushion will find its way into the space 37 and then through the porous bottom layer 36 to drain holes 35 in the bottom frame section 9. Thus any small leakage is carried out of the seat before it has a chance to reach the foam rubber cushion itself. The hair layer 36 is non-absorbent and at the same time it permits better breathability for the foam rubber since air can pass into and out of the bottom cushion via said layer 36 and the holes 35. This free passage of air over the entire bottom portion of the cushion will act to keep this area dry.

I desire it to be uderstood that this invention is not to be limited to any particular form or arrangement of parts except in so far as such limitations are included in the claims.

What I claim as my invention is:

1. In a cushioned seat, the combination of a sheet metal frame having a bottom back, and sides, a cushion mounted on the bottom portion of the frame, a cushion for the back and side portions of the frame, protective strips of flexible material at the edge portion of said frame on opposite sides thereof and extending beyond said edge portion, said cushions having coverings, covering material secured to the back of the frame adjacent its edge, and means for uniting said last named covering material with the coverings for said cushions and with the extended portions of said protective strips, said strips being covered by said cushion coverings and said covering material.

2. In a cushioned seat, the combination of a sheet metal frame having a bottom, back, and sides having arm rest portions merging into said bottom, a cushion mounted on the bottom portion of the frame, a cushion for the back, side portions, and arm rest portions of the frame, coverings for said cushions, and a continuous edging for said frame extending from the back down along the sides of the frame over said arm rest portions and the front portion of the bottom of said frame, said edging including extended portions of the coverings for the cushions and protective strips between said coverings and the edge of said frame.

3. In a cushioned seat, the combination of a sheet metal frame having a bottom, back, and sides, a cushion mounted on the bottom of the frame, a cushion for the back and side portions of the frame, protective strips of flexible material at the edge portion of the frame on opposite sides thereof and extending beyond said edge portion, a covering secured with the strip at the rear side of the frame and extending over the same, means securing the extended portions of said protective strips together, coverings for said cushions, and means for uniting said cushion coverings and the covering secured to the rear side of the frame together and to the extended ends of said protective strips, said cushion coverings extending over the protective strip at the front side of the edge portion of the frame.

4. In a cushioned seat, the combination of a sheet metal frame having a bottom, back and sides, a cushion mounted on the back portion and sides of said frame, a cushion mounted on the bottom portion of said frame and spaced from the back portion of said first named cushion to provide a ventilating clearance space, openings in the frame to permit the inlet to and exhaust of air from said space as the operator and the bottom cushion move up and down relative to said space, a covering for the top and sides of said bottom cushion, a flexible covering secured to the back of said frame over said clearance space and extending down below the top of the bottom cushion and secured to the side portions of the cushion covering of said last named cushion, drain openings in the bottom of said frame, and a porous yieldable material interposed between said apertured bottom of the frame and the bottom of the cushion and secured to the lower part of the side covering thereof to permit water to drain from the seat should leakage occur between said cushion covering and said clearance covering and to permit air to pass to the bottom portion of said bottom cushion.

References Cited in the file of this patent

UNITED STATES PATENTS

| | | |
|---|---|---|
| 2,085,569 | Bloomberg | June 29, 1937 |
| 2,551,084 | Aranov | May 1, 1951 |
| 2,551,819 | Wing | May 8, 1951 |